Patented Nov. 1, 1938

2,135,346

UNITED STATES PATENT OFFICE 2,135,346

PROCESS FOR THE PREPARATION OF AMINOANTHRAQUINONE SULPHONIC ACIDS AND NEW COMPOUNDS OBTAINABLE THEREBY

Henry R. Lee, South Milwaukee, and David X. Klein, Milwaukee, Wis., assignors to E. I. du Pont de Nemours & Company, Wilmington, Del., a corporation of Delaware No Drawing. Application February 24, 1937, Serial No. 127,566

6 Claims. (Cl. 260—60)

This invention relates to a new and improved process for the preparation of sulphonic acids of the 1-aminoanthraquinone compounds which carry no substituents in the beta-position ortho thereto. The invention relates further to the prepartion of new and valuable substituted 1-aminoanthraquinone-2-sulphonic acids which are obtainable by this process.

Several processes for preparing 1-amino-2-anthraquinone sulphonic acid are described in the prior art, some of which have been employed on a commercial scale more or less successfully. A résumé of these processes is to be found in U. S. Patent 1,871,466 of August 16, 1932, which is itself directed to an improved process for preparing this particular compound. These processes, however, due to the strenuous conditions of the reaction, are limited chiefly to the preparation of the unsubstituted 1-amino-2-anthraquinone sulphonic acid, for many substituents which may be introduced into the anthraquinone nucleus are either removed or altered by such strenuous sulphonating conditions. Due to the high temperatures heretofore employed, certain side reactions also take place with the result that theoretical yields or even approximate theoretical yields of the resulting alpha-aminoanthraquinone sulphonic acid cannot be obtained.

We have found that alpha-aminoanthraquinones can be readily sulphonated in the adjacent beta-position by subjecting them to the action of chlorosulphonic acid in an inert high-boiling solvent such as ortho-dichlorobenzene, tetrachloroethane, trichlorobenzene, nitrobenzene, etc., at temperatures of around 150° C., and that the product can be isolated in exceptionally high purity directly from the solvent mass in yields substantially equal to theory. By this process we are able to prepare new anthraquinone derivatives from which new and valuable dyestuffs may subsequently be prepared. This new sulphonation procedure makes possible the production of new 1-aminoanthraquinone-2-sulphonic acids which contain simple monovalent substituents and also heterocyclic substituted aminoanthraquinone sulphonic acids, such as, for example, 4-amino-N-methyl(1,9)anthrapyridone-3-sulphonic acid, and similarly constituted bodies.

In this process the first reaction of the chlorosulphonic acid and alpha-aminoanthraquinone apparently gives the anthraquinone-1-sulphaminic acid, which upon heating in the inert solvent is rearranged to the 1-amino-2-anthraquinone sulphonic acid in a manner similar to the conversion of aminoanthraquinone sulphate in the baking processes of the prior art. An essential feature of this invention is the discovery that the 1-anthraquinone sulphaminic acid can be converted to the 1-amino-2-anthraquinone sulphonic acid by heating in a solvent at relatively low temperatures.

Temperatures of from 145° C. to 190° C. have been found to give a satisfactory conversion of what is believed to be the anthraquinone sulphaminic acids to the 1-amino-2-anthraquinone sulphonic acids. The particular temperatures to be used will of course vary with the particular compounds being sulphonated, although temperatures below 145° C. are not recommended since at the lower temperatures the time for effecting complete conversion is unnecessarily prolonged. Since the reaction takes place readily at the lower temperatures, those above about 195–200° C. are not necessary.

The following examples are given to more fully illustrate our new and improved sulphonation process and the preparation of new and valuable dyestuff intermediates.

Example 1

112 parts of 1-aminoanthraquinone, finely powdered, are suspended in 500 parts of ortho-dichlorobenzene and 64 parts of chlorosulphonic acid are slowly added thereto under agitation. The temperature rises to 50–60° C. and an even gray color is taken on by the mass. The mass is then heated to 150–155° C. and held for 4 hours. The 1-amino-2-anthraquinone sulphonic acid may be isolated by filtration, or the entire mass may be steam distilled to free it from solvent and the aqueous solution used directly for subsequent operations or salted to isolate the alkali-metal salt. A yield of from 95 to 98% of theory of free acid is obtained.

Example 2

137.5 parts of 5-nitro-1-aminoanthraquinone, finely powdered, are suspended in 500 parts ortho-dichlorobenzene. While agitating, 64 parts chlorosulphonic acid are slowly added and the mass is heated to 170° C. for 8 hours, then cooled to room temperature. The 1-amino-5-nitro-2-anthraquinone sulphonic acid may be isolated by filtration, or the mass may be steam distilled to remove the solvent, with subsequent filtration and salting. Substantially theoretical yields are obtained.

Example 3

137.5 parts of 8-nitro-1-aminoanthraquinone, finely powdered, are suspended in 500 parts of ortho-dichlorobenzene and 64 parts of chlorosulphonic acid are slowly added thereto under agitation. The temperature is slowly raised to 170° C. and held for 8 hours. By working up as in Example 2 an exceptionally high yield of 1-amino-8-nitro-2-anthraquinone sulphonic acid is obtained.

Example 4

141 parts of 1-amino-5-methoxyanthraquinone are suspended in 700 parts of ortho-dichlorbenzene, and after agitating a short time to insure dispersion, 64 parts of chlorosulphonic acid are slowly added. The temperature is raised to 150–155° C. and held for 4 hours. It is then diluted with water made slightly alkaline by the addition of 22 parts of caustic soda. The mass is then steam distilled to remove the solvent. The aqueous solution of 1-amino-5-methoxy-2-anthraquinone sulphonic acid sodium salt thus obtained may be used directly, or may be salted to isolate the 1-amino-5-methoxy-2-anthraquinone sulphonic acid in the form of its sodium salt.

Example 5

In 500 parts of ortho-dichlorbenzene there are suspended 129 parts of 1-amino-5-chloranthraquinone, finely powdered. 64 parts of chlorosulphonic acid are slowly added under agitation, the temperature is raised to 150–155° C. and held for 8 hours. The 1-amino-5-chloro-2-anthraquinone sulphonic acid may be isolated by the procedure described in the preceding examples.

Example 6

159 parts of 1-amino-5-anthraquinone sulphonic acid are suspended in 500 parts of ortho-dichlorobenzene. 64 parts of chlorosulphonic acid are added under agitation and the mass is heated to 150–155° C. for 4 hours. The solvent is removed by steam distillation. The volume is brought to 1500 parts with the addition of water, and 95 parts of a 78% solution of sulphuric acid are added. The unchanged 1-aminoanthraquinone-5-sulphonic acid is filtered off. The filtrate contains 1-amino-2,5-disulphonic acid in good yield, which may be isolated by salting.

Among the new compounds which may be prepared by this process are the 1-amino-2-anthraquinone sulphonic acids containing in the opposite benzene ring of the anthraquinone nucleus substituents of the class consisting of nitro, chloro, methoxy, sulpho and carboxy groups, as more particularly illustrated by the above examples. The 6-chloro-, 7-chloro- and 8-chloro-1-amino-2-anthraquinone sulphonic acids may be prepared in the same manner as the 5-chloro-substituted product of Example 5. The beta-methoxy-substituted compounds, such as the 6-methoxy-1-amino-2-anthraquinone sulphonic acid, may be prepared by the same procedure outlined in Example 4, using the 6-methoxy-1-aminoanthraquinone as the starting material. The isomeric sulphonic acids, such as the 1-amino-2,6- and 2,8-disulphonic acids may also be prepared by the process more particularly described in Example 6.

In all of the above mentioned cases the sulphonation is effected at relatively low temperatures and substantially theoretical yields of very pure compounds are obtained.

We claim:

1. The process which comprises suspending a 1-amino-anthraquinone in an inert high-boiling organic solvent, reacting the same therein with chlorosulphonic acid and raising the temperature of the mass to complete the sulphonation.

2. The process which comprises suspending a 1-amino-anthraquinone in an inert high-boiling organic solvent, reacting the same therein with chlorosulphonic acid, and heating the mass to temperatures above 145° C.

3. In the process for preparing 1-amino-2-anthraquinone sulphonic acid, the steps which comprise heating a 1-aminoanthraquinone in an inert high-boiling organic solvent with chlorosulphonic acid at temperatures above 145° C., and filtering off the 1-amino-2-anthraquinone sulphonic acid from the reaction mass.

4. As new compounds, the 1-amino-2-anthraquinone sulphonic acids which carry a monovalent substituent of the class consisting of —NO$_2$, —SO$_3$H, and —OCH$_3$ in the benzene ring of the anthraquinone nucleus opposite the one to which the amino and sulphonic acid groups are attached, the —NO$_2$ group when present being in one of the positions 5 and 8, and which may be prepared by heating the corresponding substituted 1-aminoanthraquinone in an inert high-boiling solvent with chlorosulphonic acid at temperatures of 145° C. and above.

5. As a new compound, 1-amino-5-nitro-2-anthraquinone sulphonic acid.

6. As new compounds, 1-amino-2-anthraquinone sulphonic acids which carry in the benzene ring remote from that to which the amino and sulphonic acid groups are attached a second sulphonic acid radical.

HENRY R. LEE.
DAVID X. KLEIN.